(12) United States Patent
Dann (10) Patent No.: US 6,250,838 B1
(45) Date of Patent: Jun. 26, 2001

(54) GARMENT RACK LOCKING DEVICE

(75) Inventor: Earl M. Dann, Highland Park, IL (US)

(73) Assignee: L & P Property Management Company, Southgate, CA (US)

( * ) Notice: Subject to any disclaimer, the term of this patent is extended or adjusted under 35 U.S.C. 154(b) by 0 days.

(21) Appl. No.: 09/132,275

(22) Filed: Aug. 11, 1998

Related U.S. Application Data
(60) Provisional application No. 60/055,500, filed on Aug. 12, 1997.

(51) Int. Cl.$^7$ ................. F16B 7/10; A47H 1/00
(52) U.S. Cl. .................... 403/109.5; 403/109.1; 403/104; 403/377; 403/321; 403/324; 211/103; 211/208; 248/188.5; 292/265; 292/270; 292/338
(58) Field of Search ............... 403/109.5, 109.1, 403/109.2, 109.6, 110, 104, 377, 379.4, 109.8, 378, 324, 321; 211/208, 103; 248/188.5; 292/265, 338, 270

(56) References Cited

U.S. PATENT DOCUMENTS

| | | | |
|---|---|---|---|
| 811,712 | * | 2/1906 | Graefe .................... 248/408 |
| 1,798,568 | * | 3/1931 | Wagenhorst ............. 403/109.5 X |
| 2,473,632 | * | 6/1949 | Bode ...................... 403/107 X |
| 2,675,256 | | 4/1954 | Cornell . |
| 2,690,319 | * | 9/1954 | Forsythe ................ 403/104 X |
| 2,703,690 | * | 3/1955 | Petrick et al. ........... 403/109.5 X |
| 2,924,414 | | 2/1960 | Tesdal . |
| 3,065,982 | * | 11/1962 | Dodd ..................... 403/105 |
| 3,100,574 | | 8/1963 | Buechler . |
| 3,199,818 | * | 8/1965 | Ahara ..................... 248/188.5 X |
| 3,370,817 | | 2/1968 | Weber et al. . |
| 3,637,087 | * | 1/1972 | Denny .................... 211/176 |
| 3,704,850 | * | 12/1972 | Hendrickson et al. ..... 248/188.5 |
| 3,882,966 | | 5/1975 | Fasano . |
| 3,980,805 | | 9/1976 | Lipari . |
| 4,183,691 | | 1/1980 | Van Melle . |
| 5,039,139 | * | 8/1991 | McElroy et al. ........... 285/7 X |
| 5,290,974 | * | 3/1994 | Douglas et al. ............ 181/228 X |
| 5,494,333 | | 2/1996 | Wilson . |
| 5,976,118 | * | 11/1999 | Steer ...................... 604/333 X |

FOREIGN PATENT DOCUMENTS

| | | |
|---|---|---|
| 2926077 | 1/1981 | (DE) . |
| 181584 * | 5/1986 | (EP) . |
| 610707 * | 1/1994 | (EP) . |
| 610707 | 8/1994 | (EP) . |
| 1156837 * | 5/1958 | (FR) . |
| WO-90/05470 * | 5/1990 | (WO) . |

* cited by examiner

Primary Examiner—Lynne H. Browne
Assistant Examiner—Ernesto Garcia
(74) Attorney, Agent, or Firm—Laff, Whitesel & Saret, Ltd.

(57) ABSTRACT

An improved locking device for adjustable garment racks including an inner tube slidable in and out from an outer tube. The improved locking device includes a sleeve having a simplified locking tab for engaging and locking the inner tube in a position relative to the outer tube and a touch tab by which an operator may easily and safely manipulate the sleeve to an unlocked position for adjustment of the inner tube relative to the outer tube and again lock the inner/outer tube combination.

13 Claims, 6 Drawing Sheets

GARMENT RACK LOCKING DEVICE

This application is based on U.S. provisional application Ser. No. 60/055,500 filed on Aug. 12, 1997.

FIELD OF THE INVENTION

The subject invention relates to improvements in garment racks. More particularly, the invention relates to improvements in locking devices for extendable elements of garment racks such that the locking device can be easily, quickly, and safely manually operated in order to change the position of one element relative to another element of the garment rack.

BACKGROUND OF THE INVENTION

Items such as garments are organized, stored, displayed, and offered for sale typically by supporting them on hangers and placing those hangers on racks. A wide variety of garment racks are available for this purpose. Garment racks may include members having elements that may extend relative to another so that the rack may be adjusted to accommodate garments of different sizes and lengths or simply to organize, store, or display the garments in alternative patterns.

Certain of such adjustable garment racks include an inner tube sized and shaped to slide within a hollow outer tube and such that the total length provided by the combination of the inner and outer tube may be adjusted as needed and a sleeve by which the relative positions of the inner tube and outer tube may be releasably locked. A locking sleeve of this type is taught in Patent No. EP 610707 assigned to Umdasch Shop-Systems GmbH. This known locking sleeve is shown as being used with a system that includes an inner tube and outer tube each of which is sized and shaped such that the outer surface of the inner tube is in slidable generally contiguous contact with the inner surface of the outer tube. The known sleeve includes a wall that is sized and shaped to extend completely around a portion of the inner tube. The sleeve is positioned adjacent to an upper end of the outer tube. The sleeve wall is taught as having a thickness such that the outer surface of the sleeve is not even with but projects above the outer surface of the wall of the outer tube. The known locking sleeve includes a raised area on an inner side of the front portion of the locking sleeve wall that is shaped in the form of a wedge or a cup. The shaped raised area includes a support surface that can catch the top portion of the wall that forms each of the holes that open along one face of the inner tube—such as when the inner tube is released after being drawn outward from the outer tube. The shaped raised area includes also a tapered wall that extends from the support surface to the outer face of the locking sleeve wall such that when the inner tube is raised the bottom portion of the wall that forms the inner tube wall holes engages the tapered surface and biases the locking sleeve upward so that it pivots—such as at a pivot point—thereby freeing the inner tube so that it can be raised.

In order that the position of the inner tube relative to the outer tube releasably fixed by this known sleeve can be raised, one operator must grasp the inner tube with one hand. By raising the inner tube, the engagement of the inner tube hole wall with the locking sleeve causes a portion of the locking sleeve to pivot upward and from the locking position. Releasing the inner tube causes the locking sleeve to pivot in the opposite direction and the wall forming one of the inner tube holes to come to catch and rest on the support surface of the shaped raised area.

However, in order that the position of the inner tube relative to the outer tube releasably fixed by this known sleeve can be lowered, one operator must grasp the inner tube with one hand and the same or another operator must grasp the outer surface of the locking sleeve and raise it a sufficient distance so that the shaped raised area and particularly the support surface of the sleeve is spaced away from the outer surface of the inner tube and no longer locking the portions of the two tubes. The inner tube may then be lowered to the desired height and the known sleeve released to releasably fix. the positions of the tubes again.

Such embodiments of known locking devices that do not include a feature to allow an operator to easily and safely manipulate the position of the locking device with a minimum contact of the operator's hand with the locking device. Such embodiments can present a danger to the operator. An operator can grasp the outer surface of the known locking device to move it in an non-engaging position without thinking what will occur when the inner tube is released. When released, the inner tube can catch the raised surface of the locking sleeve thereby causing it to pivot downward. If the operator happens to have a finger or fingers or other part of the operator's hand adjacent to and along the lower portion of the locking sleeve, the pivoting action can cause the operator's finger or fingers or other portion of the operator's hand to be pinched between the locking device and the outer tube. The pinching effect can be particularly harmful to the operator if the inner tube was supporting a considerable weight when released by the operator.

Such embodiments that require the operator to make considerable contact with the surface of the locking sleeve can also require additional clean up steps after the sleeve is released and the tubes are fixed in position. Often times when the tubes are part of a display system, the tubes, as does the locking sleeve, have a shiny surface such as a chrome surface. Such a surface easily shows up finger prints or handprints. The prints on the known sleeve typically must be cleaned off to maintain the appearance of the shiny surface.

Embodiments of the locking devices of known adjustable garment racks that include complex shaped components such as the wedge-shaped or cup-shaped raised area may be more costly to manufacture because of the greater amount of time required to produce the complex structures without error.

Embodiments of the locking devices of known adjustable garment racks that include complex shaped components that are used with a combination of inner tube and outer tube in which the outer surface of the inner tube is in generally contiguous contact with the inner surface of the outer tube may not be able to operate as expected with other combinations of inner tube and outer tube in which the tubes are not in general contiguous contact but instead largely spaced apart from each other.

Embodiments of the locking devices of known adjustable garment racks that include a surrounding sleeve wall that has a thickness that is greater than that of the outer tube of the rack may be overall more costly to manufacture also because of the greater amount of material that is required and may be overall heavier.

Further, such embodiments of known locking devices that include a sleeve wall that is thicker than the wall of the outer tube appears to have an added on, less integral appearance relative to the other components of the rack than would a locking device having an outer surface that is generally even with the surface of the outer tube.

A demand therefore exists for an improved locking device that is safe and simple to operate and maintain, is generally simple and relatively inexpensive to manufacture, and is sized and shaped to appear generally integral with the surface of the outer tube. The present invention satisfies this demand.

SUMMARY OF THE INVENTION

The present invention is directed to an improved locking device for an adjustable garment rack including an inner tube slidable in and out from an outer tube.

The improved locking device includes a sleeve having an opening sized and shaped such that the inner tube of the rack may slide therethrough. In an operational position, the sleeve is placed adjacent to the upper portion of the outer tube. The sleeve includes a simplified locking tab extending from the inner surface of the front portion of the sleeve. The locking tab is sized and shaped and is formed from a material such that inner tube may be supported on an upper surface of the tab by the engagement of the upper portion of the holes opening along a front wall of the inner tube on the upper tab surface. Such engagement occurs such as when the inner tube is adjusted in height and the upper surface of a hole opening in the inner tube is allowed to rest on the upper tab surface. The locking tab is sized and shaped and positioned also to cause the locking tab to rotate out from a locking position simply when the inner tube is raised. The sleeve includes also a touch tab sized and shaped and positioned on the outer surface of the sleeve to allow an operator to manipulate the sleeve without having to grasp the sleeve and simply by using the tip of one of the operator's fingers. When an operator pushes down on the upper surface of the touch tab such as with the operator's thumb or other finger, the front portion of the sleeve rises up. Such movement frees the locking tab from engaging contact with the inner tube holes thereby allowing the inner tube to be moved such as downward. The touch tab preferably extends from the sleeve at an angle from the outer surface of the rear portion of the sleeve to allow even such contact of the operator's finger tip with the touch tab to be at a distance from the outer surface of the wall of the sleeve to lessen the likelihood that the operator's hand will be harmed during the unlocking/locking operation. The locking tab and the touch tab may be formed by punching the same material from which the sleeve is formed into the desired shape. The tabs may be formed also by adding appropriately sized and shaped material onto the surface of a sleeve such as by welding. Such simplified construction methods advantageously allow the improved locking device to be manufactured easily and inexpensively.

It is, accordingly, a general object of the present invention to provide an improved apparatus by which the relative position of an inner tube and outer tube of an adjustable garment rack may be releasably locked.

Another object of the present invention is to provide an apparatus by which the positions of the inner tube and outer tube of an adjustable garment rack may be releasably fixed relative to each other with little likelihood that the operator may be harmed.

An additional object of the present invention is to provide a releasable locking device that is sized and shaped to appear generally integral with the surface of the outer surface of the outer tube.

The invention, together with the further objects and advantages thereof, may be best understood by reference to the following description taken in conjunction with the accompanying drawings, in the several figures of which like reference numerals identify like elements.

BRIEF DESCRIPTION OF THE DRAWINGS

FIG. 6A is a perspective view of the improved locking device and inner tube/outer tube combination showing the manipulation of the inner tube to raise its position relative to the position of the outer tube; and, FIG. 6B is a perspective view of the improved locking device and inner tube/outer tube combination showing how the positioning of the inner tube relative to the outer tube can be accomplished safely and quickly by the application of pressure on the touch tab of the improved locking device.

DESCRIPTION OF THE PREFERRED EMBODIMENTS

Certain such adjustable garment racks utilize a combination of an inner tube and outer tube such that the inner tube is sized and shaped to slide within a hollow outer tube and such that the total length provided by the combination of the inner tube and outer tube may be adjusted as needed.

Figure 1:
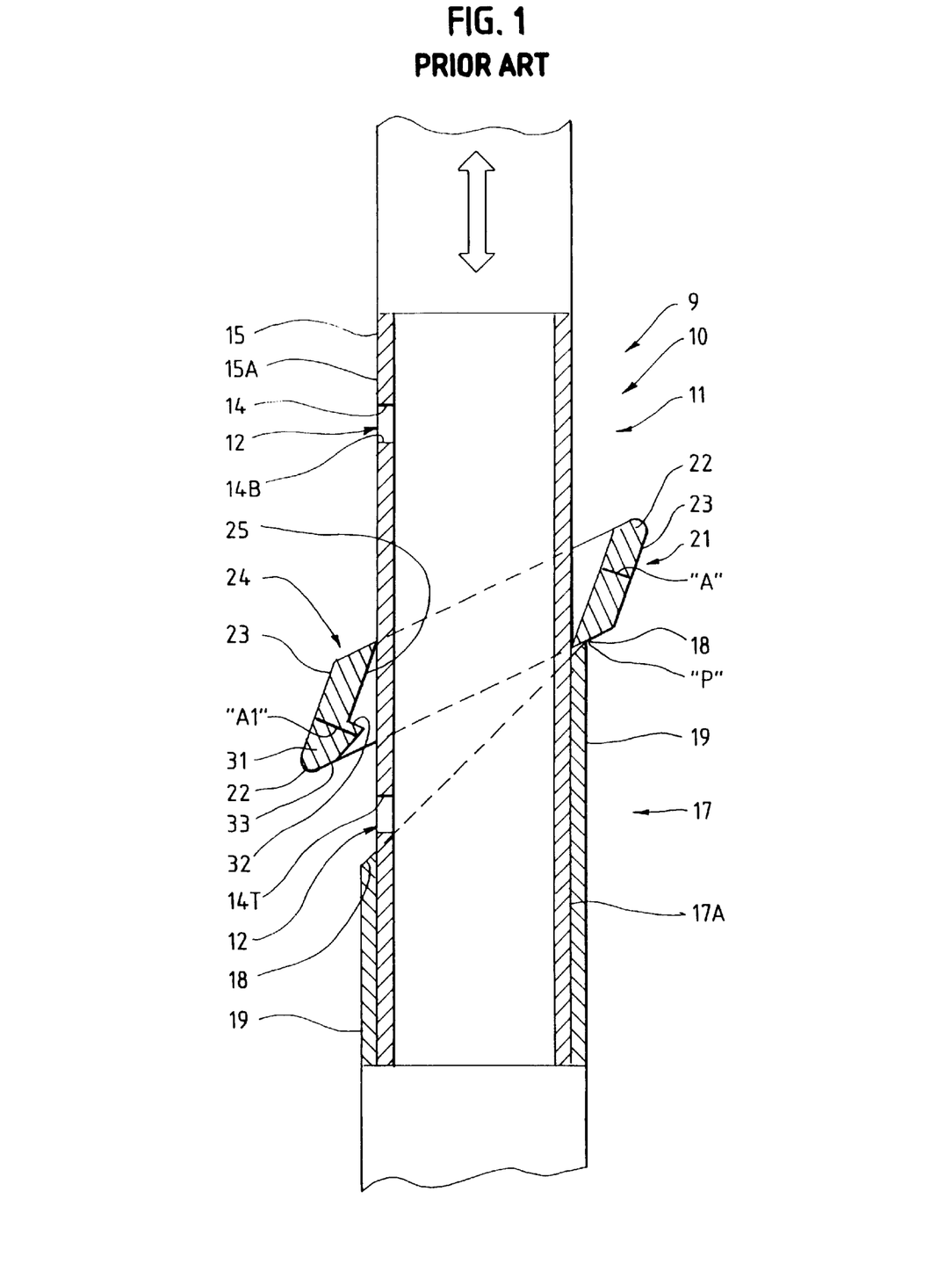
FIG. 1 is a broken-away cross-sectional view of a known locking sleeve.
Figure 2A:
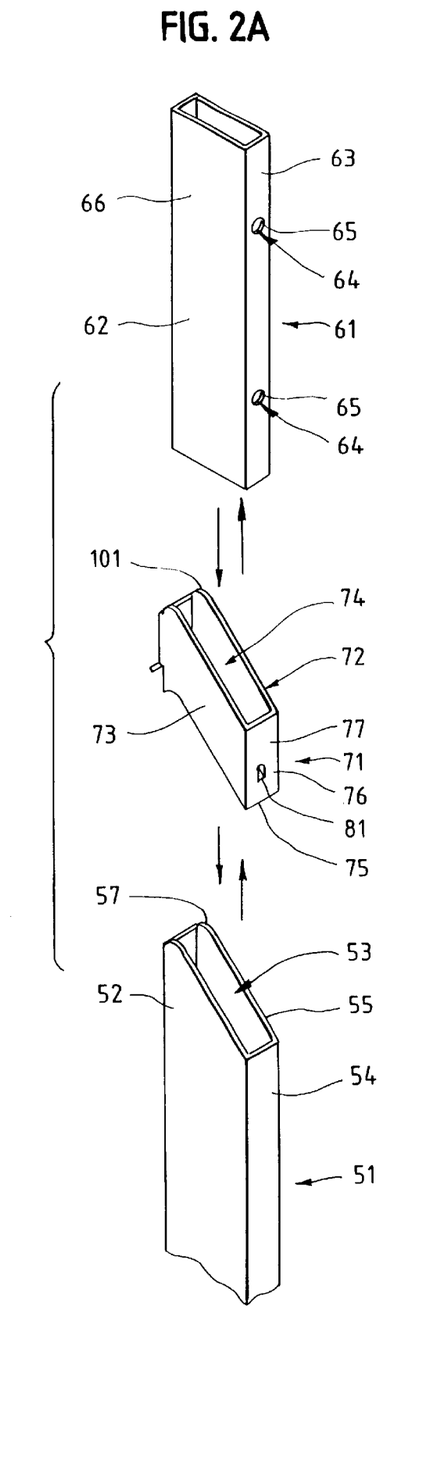
FIG. 2A is a partially broken, perspective view of an improved garment rack locking device according to the invention showing also the front face and having a locking tab formed such as by punching out a portion of the sleeve front wall.
Figure 2B:
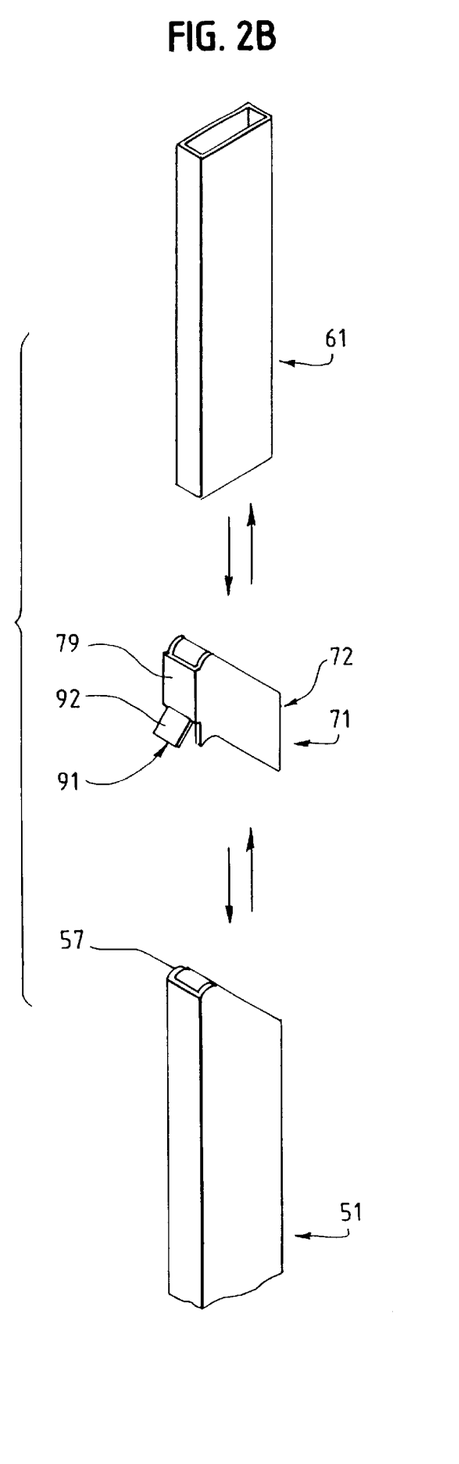
FIG. 2B is a partially broken, perspective view of the improved garment rack locking device illustrated in FIG. 2A and showing also the rear face including a touch tab formed such as by punching out the sleeve rear wall.
Figure 3A:
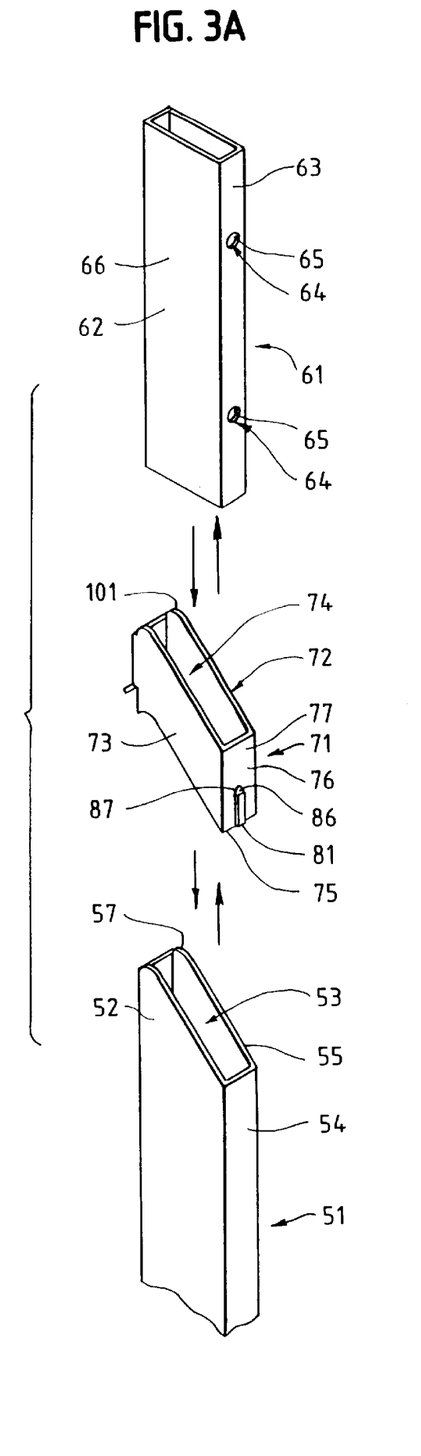
FIG. 3A is a partially broken, perspective view of an improved garment rack locking device according to the invention showing also the front face and including a locking tab formed such as by joining an element to the sleeve front wall.
Figure 3B:
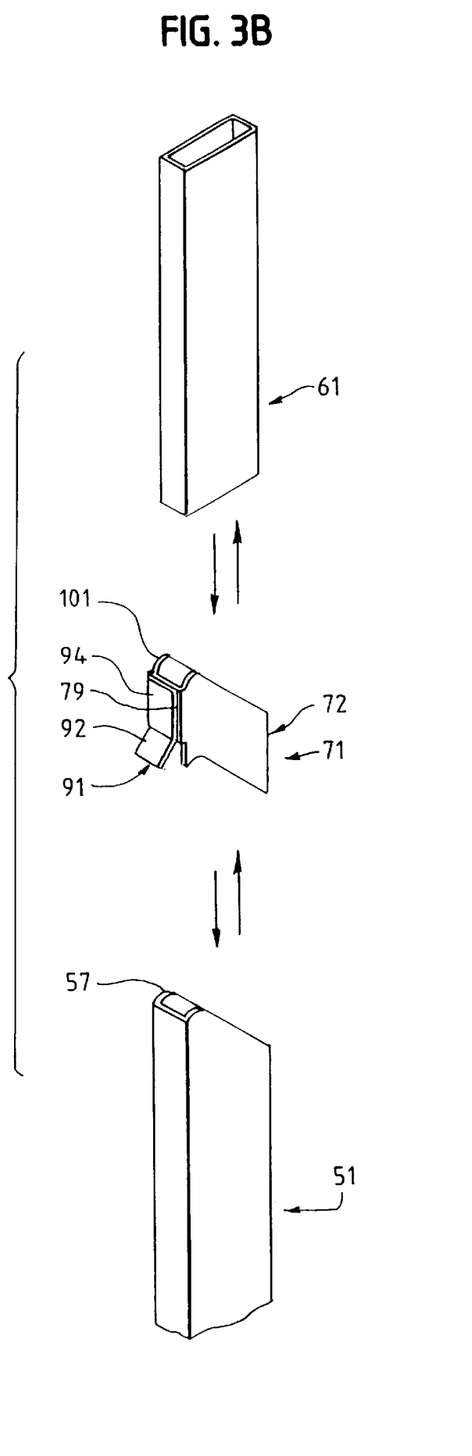
FIG. 3B is a partially broken, perspective view of the improved garment rack locking device illustrated in FIG. 3A and showing the rear face including a touch tab formed such as by joining an element to the sleeve rear wall.

FIG. 1 illustrates a broken-away, cross-sectional view of a known locking sleeve 9 taught in Patent No. EP 610707 assigned to Umdasch Shop-Systems GmbH, by which the relative positions of one such inner tube/outer tube combinations may be releasably locked. The combination 10 of inner tube 11 and outer tube 17 shown in the identified Patent is one in which the inner tube and the outer tube are of a certain proportion such that the outer surface 15 of the inner tube is in general contiguous contact with the inner surface 17A of the outer tube 17. This known locking sleeve 21 comprises a wall 22 that is sized and shaped to extend completely around the inner tube 11. The known sleeve 21 is carried adjacent to an upper end 18 (shown in part in phantom in FIG. 1 of the outer tube 17. The sleeve wall 22 is shown in the identified Patent as having a thickness—identified in FIG. 1) as "A"—such that the outer surface 23 of the sleeve 21 is not even with but projects above the outer surface 19 of the outer tube 17 when the known sleeve is in a locking position. The sleeve wall 22 includes an enlarged area 31—having a thickness "A1"—that rises above the sleeve inner face 25 of the front portion 24 of the locking sleeve wall 22. The enlarged area 31 is taught as having a shape in the form of a wedge or a cup. The shaped enlarged area 31 includes a support surface 32 that can catch the top 14T of the inner wall 14 that forms each of the identical holes 12—that open through the inner tube outer front face 15A—such as when the inner tube 11 is released after being drawn outward from the outer tube 17. The shaped raised area 31 includes also a tapered surface 33 that extends from the support surface 32 to the outer surface 23 of the locking sleeve wall 22 such that, when the inner tube 11 is raised, the bottom 14B of the inner wall—that forms each of the identical inner tube holes 12—engages the tapered surface 33 and biases the locking sleeve 21 upward so that the front sleeve wall 24 rises up and the sleeve 21 pivots—such as at a pivot point "P"—thereby causing the enlarged area 31 to move from a locking position within the hole 12 and to touch only the outer front face 15A of the inner tube 11 and freeing the inner tube 11 so that it can be raised.

The invention described in the identified Patent requires that for an operator to adjust the inner tube 11 to a lower position relative to the outer tube 17 the operator must grasp the outer surface 23 of the locking sleeve wall 22 and move the front sleeve wall 24 a sufficient distance upward so that the raised area 31 and particularly the support surface 32 of the sleeve 21 is largely spaced away from the outer front face 15A of the inner tube 11. By holding the sleeve wall 22 in this fashion, the operator can lower the inner tube 11 to the desired height. The operator can lock the inner tube 11 by placing the sleeve wall 22 in contact with the inner tube 11 so that the support surface 32 of the raised area 31 can catch the top 14T of the inner wall 14 of one of the identical holes 12 that open through the inner tube front face 15A.

An improved locking device according to the present invention is generally illustrated and designated in FIGS. 2A, 2B, 3A, 3B, 4A, 4B, 5A, 5B, 6A, and 6B by reference number 71. The improved locking device 71 is usable to releasably fix the position of an outer tube 51 that is movable relative to the inner tube 61 of a garment rack having adjustable elements. The outer tube 51 includes an outer tube wall 52 sized and shaped to form an opening 53 through which an appropriately sized and shaped inner tube 61 may slide in and out. The inner tube 61 includes a inner tube wall 62 having a front face 63 through which one or more generally identical holes 64—defined by hole wall 65—open.

The improved locking device 71 is a sleeve 72 having a wall 73 sized and shaped to form a sleeve wall opening 74 through which the inner tube 61 may slide and, with the lower edge 75 of sleeve 72 positioned adjacent to the upper edge 55 of the outer tube 51, the outer surface 76 of the sleeve wall 73 generally parallels the outer surface 54 of the outer tube 51. The sleeve wall 73 is preferably of a thickness "I" such that the outer surface 76 of the sleeve 72 does not project above and is generally even with the surface 54 of the outer tube 51. The wall 73 includes a front face portion 77 and an opposing rear portion 79. Advantageously, the sleeve wall 73 may be of a generally uniform thickness. Advantageously, such a uniform thickness sleeve wall 73 may be formed from a single sheet of material—such as one made from a metal alloy—by cutting, bending, and joining—such as at the rear portion 79 of the sleeve wall 73 by welding or other means—the single sheet of material. The locking device 71 may be formed also as a single unit such as by molding or other related methods.

The sleeve 72 includes a locking tab 81. Locking tab 81 includes a locking tab arm 86 extending at an angle from the inner surface 78 of the front portion 77 of the sleeve wall 73. The locking tab 81 is sized and shaped and is formed from a material such that inner tube 61 may be supported on an upper surface 82 of the tab arm 86 by the engagement of the upper portion 65T of the hole wall 65 opening along and through the front tube face 63 of the inner tube 61 on the tab upper surface 82. Such engagement occurs such as after the inner tube 61 is adjusted in height and is released so that the upper portion 65T of a hole wall 65 opening in the inner tube 61 comes to rest on the tab upper surface 82 to produce a locked position.

Figure 4A:
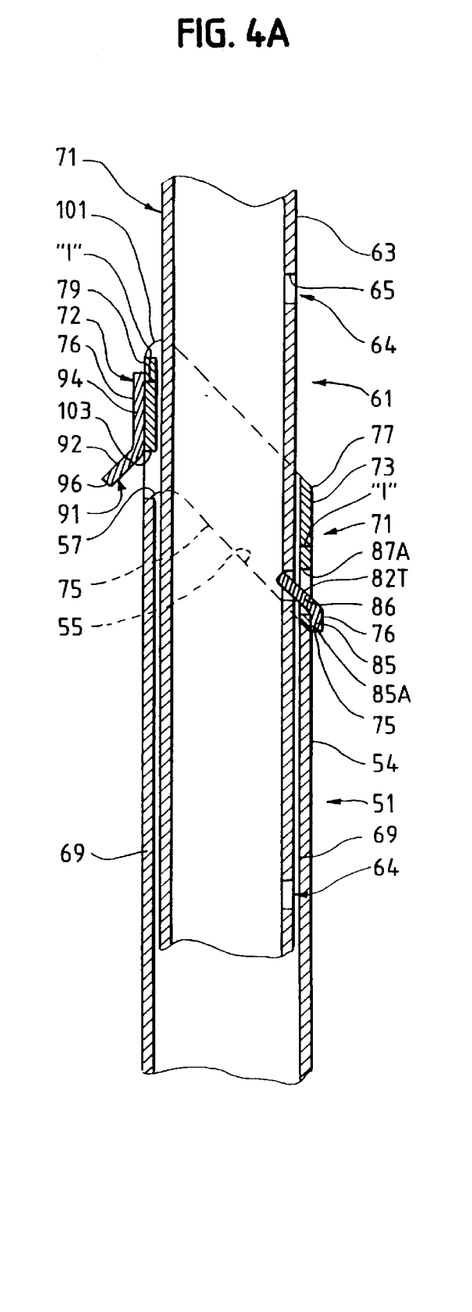
FIG. 4A is a cross-sectional view of the improved locking device illustrated in FIG. 2A and FIG. 2B positioned to lock the position of an inner tube of a garment rack relative to the position of an outer tube of a garment is rack.
Figure 5A:
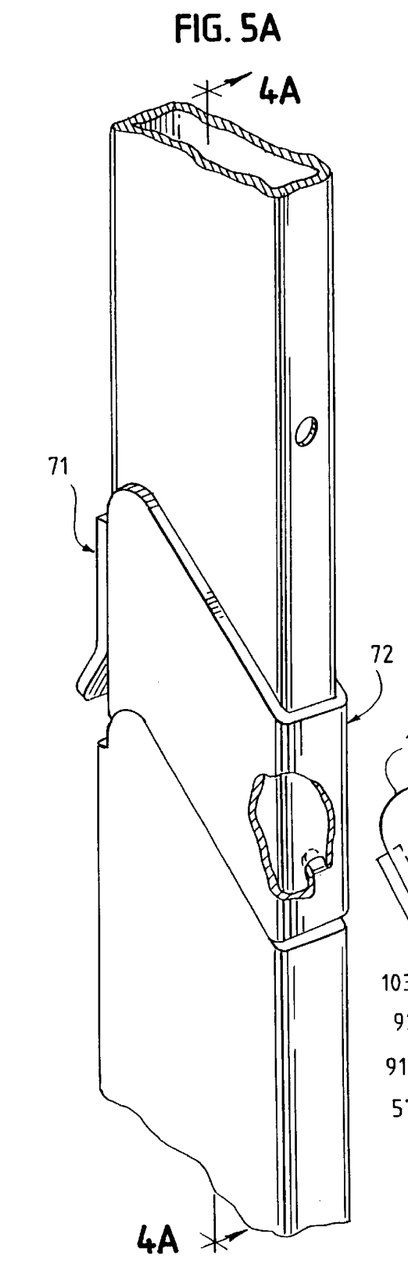
FIG. 5A is a cross-sectional view of the improved locking device illustrated in FIG. 3A and FIG. 3B positioned to lock the position of an inner tube of a garment rack relative to the position of an outer tube of a garment rack.

FIGS. 4A and 5A show a cross-sectional view of embodiments of the improved locking device 71 in a locked position with the lower edge 75 (shown in phantom) of sleeve 72 aligned adjacent to the upper edge 55 (shown also in phantom) of the outer tube 51, the outer surface 76 of the sleeve wall 73 generally parallel to and even with the outer surface 54 of the outer tube 51, and the upper portion 65T of the hole wall 65 defining one of the holes 64 that open through the front tube face 63 of the inner tube 61 resting on the tab upper surface 82.

The sleeve 72 includes a touch tab 91 extending at an angle from the outer surface 76 of the rear portion 79 of the sleeve wall 73. The touch tab 91 is sized and shaped and formed from a material such that when an operator pushes down on the upper surface 92 of the touch tab 91, such as with the operator's thumb or other finger, the front portion 77 of the sleeve 72 rises up.

Figure 4B:
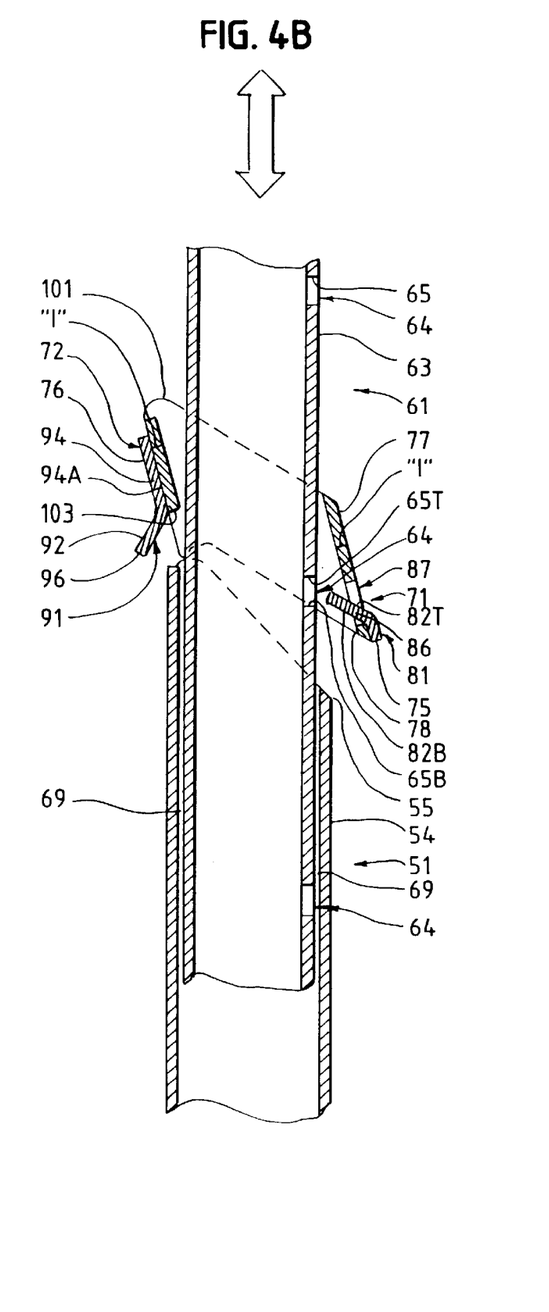
FIG. 4B is a cross-sectional view of the improved locking device illustrated in FIG. 2A, FIG. 2B, and FIG. 4A showing the position of the device after pressure has been applied to an upper surface of the rear wall touch tab and the device resultingly biases upward such that the locking tab of the device has moved out from a hole in the inner tube thereby allowing the inner tube to be moved.

The locking tab 81 and/or the touch tab 91 may be formed by punching the same material from which the sleeve 72 is formed into the desired shape. FIGS. 2A and 2B and 4A and 4B illustrate an embodiment of the present invention in which the locking tab 81 and the touch tab 91 are punched from the sleeve wall 73. With reference to FIGS. 4A and 4B, the locking tab 81 formed by punching out the sleeve wall 73 provides a locking arm 86 that has a thickness equal to that of the front portion 77 of the sleeve wall 73 and that extends from an aperture 87—defined by aperture wall 87A—that opens through the sleeve front portion 77. In the FIGS. 4A and 4B embodiment, the touch tab 91 formed by punching out the sleeve 73 provides a touch tab arm 96 that has a thickness equal to that of the rear portion 79 of the sleeve wall 73 and that extends rearward from the rear portion 79 of the sleeve wall 73.

The locking tab 81 and/or the touch tab 91 may be formed also by joining—such as by welding—appropriately sized and shaped material onto sleeve 72. FIGS. 3A and 3B and FIGS. 5A and 5B illustrate an embodiment of the present invention in which the locking tab 81 includes a leg 85 having an inner leg face 85A joined to the surface 76 of the front portion 77 of the sleeve 72 and a locking tab arm 86 projecting through an aperture 87 formed by an aperture wall 87A to provide the surface 82 on which the inner tube 61 may rest for locking the inner tube 61 relative to the outer tube 51. The embodiment of the invention illustrated in FIGS. 3A and 3B and FIGS. 5A and 5B include also a touch tab 91 formed by joining the touch tab joining face 94A of the joining element 94 to the outer surface 76 of the rear portion 79 of the sleeve 72.

Figure 5B:
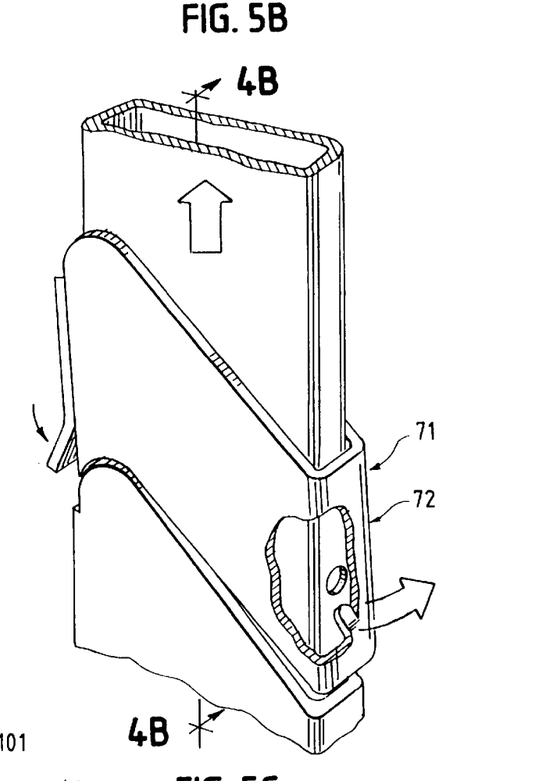
FIG. 5B is a cross-sectional view of the improved locking device illustrated in FIG. 3A, FIG. 3B, and FIG. 5A showing the position of the device after pressure has been applied to an upper surface of the rear wall touch tab and the device resultingly biases upward such that the locking tab of the device has moved out from a hole in the inner tube thereby allowing the inner tube to be moved.
Figure 5C:
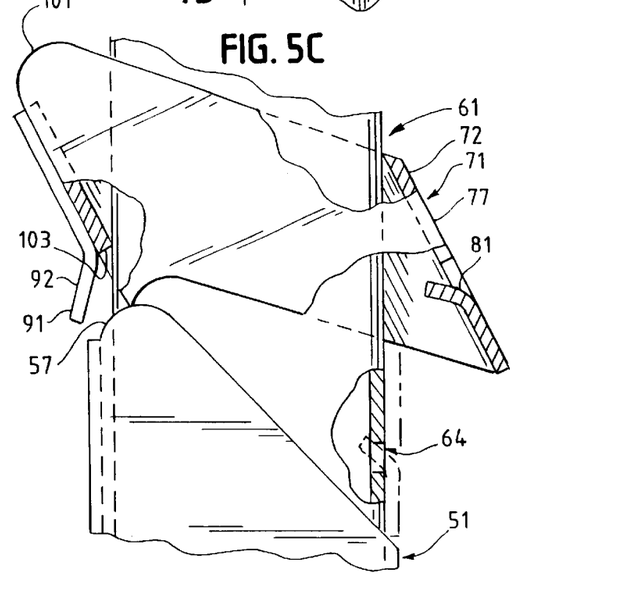
Figures 6A, 6B:
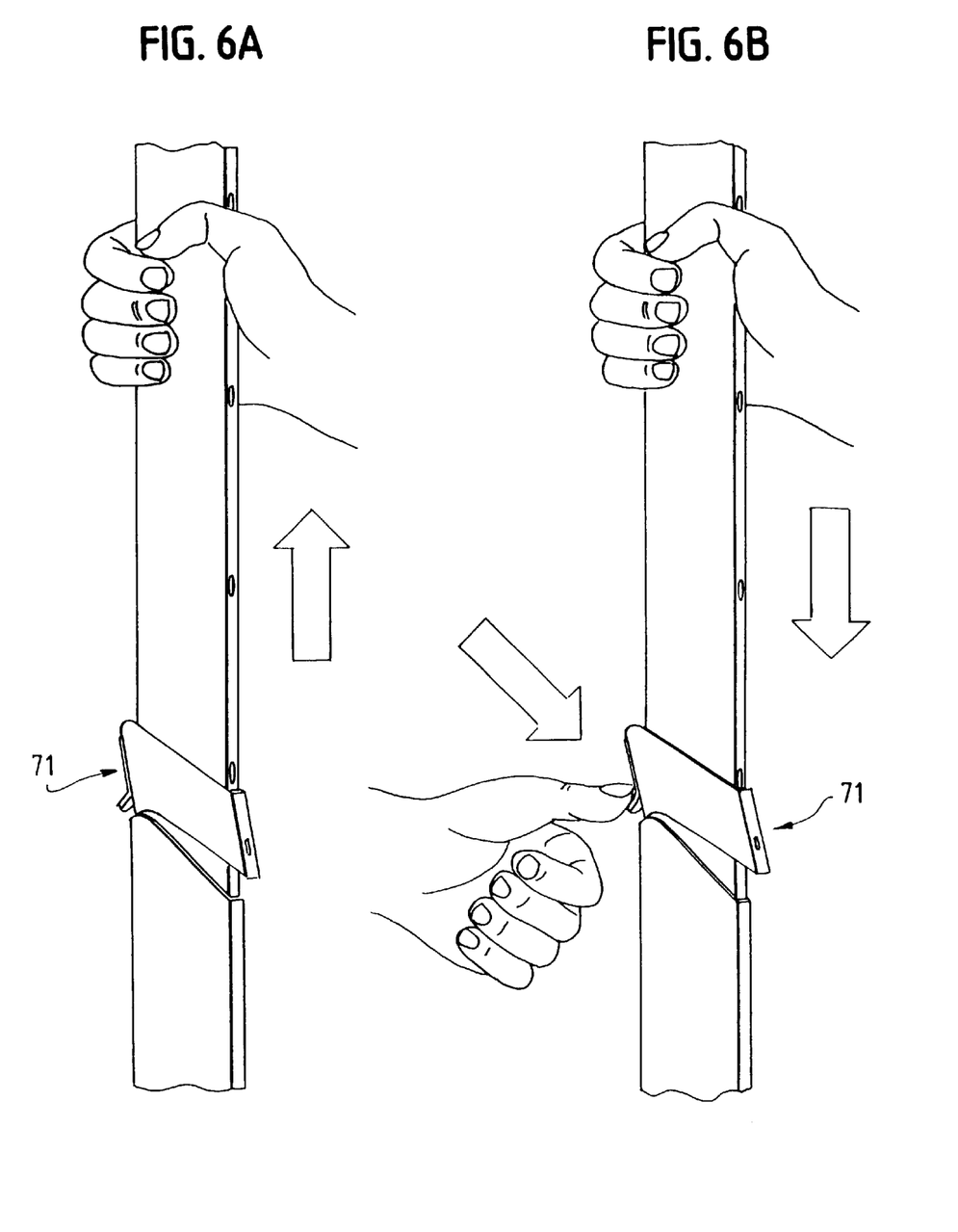

As shown in FIGS. 6A and 6B, to adjust the position of the inner tube 61 relative to the position of the outer tube 51, an operator grasps with one hand the surface 66 of the inner tube 61 and, for example, with a thumb or other finger of the other hand pushes downward on the upper surface 92 of the touch tab 91. FIGS. 4B and 5B show a cross-sectional view of the improved locking device 71 showing the position of the device after pressure has been applied to an upper surface 92 of the touch tab 91 and, as a result, the front portion 77 of the sleeve 72 biases upward such that the locking tab 81 of the device 71 has moved out from a hole 64 in the inner tube 61 and an unlocked position has been produced thereby allowing the inner tube 61 to be moved upward or downward. For more extensive adjustment of the inner tube 61 relative to the outer tube 51, the sleeve 72 may be separated from and moved above and away from a position adjacent to the outer tube 51.

Advantageously, the improved locking device 71 can lock the position of the inner tube 61 relative to the outer tube 51 even when the inner tube and outer tube are not sized and shaped to provide general contiguous contact with each other but instead provide a space 69 between the tube surfaces.

The device 71 may include elements that further improve the safety and use of the device 71. The illustrated embodiments of the present invention include a rounded edge 101 which decreases the likelihood that an operator will be harmed while attempting to push down on the touch tab 91. The illustrated embodiments of the present invention also include an outer tube rounded edge 57 that allow the sleeve to move smoothly when the touch tab 91 is depressed.

The improved locking device is advantageous in that the sleeve is of a simplified construction and as a result generally easier and cheaper to manufacture. The device may be operated by pushing on the touch tab of the locking sleeve thereby virtually eliminating the likelihood that the operator may catch and harm the operator's fingers or hand between the sleeve and the outer tube such as when the operator attempts to lock the inner tube in place.

It will be understood that the embodiments of the present invention which have been described are illustrative of some of the applications of the principles of the present invention. Numerous modifications may be made by those skilled in the art without departing from the true spirit and scope of the invention.

What is claimed is:

1. An improved tube locking apparatus of a type having a wall of a thickness and of a shape defining an inner space sized and shaped to allow an inner tube to slide therethrough and be engaged thereby relative to an outer tube, the inner tube having a plurality of faces, the wall including an outer surface, an inner surface, and an attachment sized and shaped to fit into a hole in one of the faces of the inner tube and thereby support the inner tube thereon, wherein the improvement comprises:

an aperture wall defining an aperture through a front portion of the wall;

the attachment is a planar shaped locking tab angled from said aperture and the inner surface of said front portion of said wall, said planar shaped locking tab including an upper surface sized and shaped to engage an upper portion of the inner tube hole and to lock the inner tube in a locking position relative to the outer tube until unlocked; and a touch tab angled from a rear portion of the outer surface of the wall, said touch tab including a touch tab upper surface sized and shaped to permit an operator to apply digital pressure to said upper surface such that said front portion of the wall is raised and said locking tab is correspondingly moved from said locking position to an unlocked position and upon release of the digital pressure on said upper surface of said locking tab said front portion of the wall falls to permit the inner tube to be locked again relative to the outer tube.

2. The improved tube locking apparatus as claimed in claim 1 wherein said locking tab includes a locking tab arm having an arm thickness generally equal to the wall thickness.

3. The improved tube locking apparatus as claimed in claim 1 wherein said touch tab includes a touch tab arm having a touch tab arm thickness generally equal to the wall thickness.

4. The improved tube locking apparatus as claimed in claim 1 wherein said locking tab includes a leg having an inner leg face joined to the outer surface of said front portion of the wall and a locking tab arm projecting through said aperture.

5. The improved tube locking apparatus as claimed in claim 1 wherein said touch tab includes a joining element, and said touch tab is attached to the outer surface of said rear portion of the wall by said joining element.

6. An improved locking device for an adjustable garment rack, the garment rack including a hollow outer tube within which an inner tube may slide for adjustment of the garment rack, the hollow outer tube having an outer tube wall including an outer tube thickness and an outer tube outer surface, the inner tube including an inner tube wall having a front face through which a plurality of inner tube wall holes open, the inner tube wall holes each defined by a hole wall, a sleeve having a sleeve wall sized and shaped to extend around a length of the inner tube wall and such that the inner tube may slide through the sleeve, the sleeve wall including a sleeve outer surface, a sleeve inner surface, a sleeve front portion, a sleeve rear portion, and a sleeve lower edge, the sleeve lower edge sized and shaped such that the sleeve may be positioned adjacent to an upper edge of the outer tube, wherein the improvement comprises:

a planar shaped locking tab including a locking tab arm extending from the sleeve inner surface of the front portion of the sleeve wall and having a tab thickness generally equal to sleeve wall thickness of the sleeve and sized and shaped such that said tab arm is generally insertable into one of the inner tube wall holes, said locking tab arm including an upper tab surface sized and shaped to engage an upper portion of the one of the inner tube wall holes into which said locking tab arm is inserted and thereby support the inner tube on said locking tab to form a locked position between the inner tube relative to the sleeve, said sleeve wall thickness generally equal to the outer tube thickness such that the sleeve wall outer surface is generally even with the outer tube outer surface when said locking tab is in said locked position, a planar shaped touch tab including a touch tab arm extending from the sleeve outer surface of the rear portion of the sleeve wall and having a tab thickness generally equal to said sleeve wall thickness of the sleeve, said touch tab arm including a touch tab upper surface sized and shaped to accept application of pressure from an operator's finger on said touch tab upper surface such that said touch tab can be moved downward and the sleeve thereby rotated at a point approximate to said touch tab such that said locking tab is disengaged from the inner tube hole to unlock the inner tube relative to the sleeve and form an unlocked position, whereby said locked position between the inner tube relative to the outer tube can be formed again by removal of the application of the pressure on said touch tab upper surface.

7. The improved locking device as claimed in claim 6 wherein the outer tube includes rounded edges proximal to said touch tab.

8. A locking device for an adjustable rack having an inner tube sized and shaped to slide within a hollow outer tube, the inner tube having a front wall with a plurality of holes opening along the length of the front wall, the locking device comprising:

a sleeve with a locking tab and a touch tab;

the sleeve having a front portion, a rear portion, and an opening sized and shaped such that the inner tube of the rack may slide therethrough;

the locking tab positioned on the front portion of the sleeve and sized and shaped to engage one of the holes on the front wall of the inner tube to lock the inner tube in position relative to the outer tube; and the touch tab positioned on the rear portion of the sleeve and sized and shaped such that when pressure is applied to the touch tab, the front portion of the sleeve rotates away from the front wall of the inner tube.

9. The locking device of claim 8, wherein the sleeve has an outer surface sized and shaped to appear generally integral with the outer surface of the outer tube.

10. The locking device of claim 8, wherein the locking tab is formed by punching the same material from which the sleeve is formed.

11. The locking device of claim 10, wherein the touch tab is formed by punching the same material from which the sleeve is formed.

12. The locking device of claim 8, wherein the locking tab is formed by adding an appropriately sized and shaped material onto the front portion of the sleeve.

13. The locking device of claim 12, wherein the touch tab is formed by adding an appropriately sized and shaped material onto the rear portion of the sleeve.

* * * * *